United States Patent
Cochrane et al.

(10) Patent No.: US 9,911,161 B2
(45) Date of Patent: Mar. 6, 2018

(54) METHOD AND SERVER FOR ANALYZING SOCIAL MEDIA CONTENT BASED ON SURVEY PARTICIPATION DATA RELATED TO A WEBSITE

(71) Applicant: IPerceptions inc., Montreal (CA)

(72) Inventors: Lane Cochrane, Kirkland (CA); Matthew Butler, Montreal (CA); Naoko Tomioka, Montreal (CA)

(73) Assignee: iPerceptions Inc., Montreal (CA)

( * ) Notice: Subject to any disclaimer, the term of this patent is extended or adjusted under 35 U.S.C. 154(b) by 535 days.

(21) Appl. No.: 14/576,635

(22) Filed: Dec. 19, 2014

(65) Prior Publication Data

US 2016/0179973 A1   Jun. 23, 2016

(51) Int. Cl.
*G06F 17/30* (2006.01)
*G06Q 50/00* (2012.01)

(52) U.S. Cl.
CPC ....... *G06Q 50/01* (2013.01); *G06F 17/30899* (2013.01)

(58) Field of Classification Search
CPC ......... G06F 17/30899; G06F 17/30864; G06F 17/30867; G06F 17/2785; G06F 17/30401; G06F 17/3005
See application file for complete search history.

(56) References Cited

U.S. PATENT DOCUMENTS

| | | | |
|---|---|---|---|
| 4,958,284 A * | 9/1990 | Bishop | G06Q 30/02 434/353 |
| 8,818,788 B1 | 8/2014 | Mihalik et al. | |
| 8,935,275 B2 * | 1/2015 | Rathod | G06F 17/30867 707/609 |
| 9,807,442 B2 * | 10/2017 | Bhatia | H04N 21/2668 |
| 2003/0172075 A1 * | 9/2003 | Reisman | G06F 17/30648 |
| 2006/0161470 A1 * | 7/2006 | Smith | G06Q 10/06375 705/7.37 |
| 2007/0192166 A1 * | 8/2007 | Van Luchene | G06F 17/30646 705/14.54 |
| 2008/0104045 A1 * | 5/2008 | Cohen | G06F 17/30528 |
| 2011/0276513 A1 | 11/2011 | Erhart et al. | |

(Continued)

OTHER PUBLICATIONS

Jonathan L. Herlocker et al., Evaluating Collaborative Filtering Recommender Systems, Jan. 1, 2004. 49 pages.*

*Primary Examiner* — Noosha Arjomandi
(74) *Attorney, Agent, or Firm* — IP Delta Plus Inc.

(57) ABSTRACT

A method and survey server for analyzing social media content based on survey participation data related to a website. The survey server collects survey participation data comprising text and a metric. The survey participation data correspond to survey information received from users of a plurality of user devices in relation to a visit of the website. The survey server analyzes the text of the survey participation data, to generate a correlation between words or groups of words present in the text and the metric. Social media content comprising text and related to a visit of the website is also collected. The text of the social media content is analyzed, to identify the words or groups of words. The social media content comprising the words or groups of words is associated with the metric. The analysis of the text of the survey participation data may comprise performing a semantic categorization.

16 Claims, 5 Drawing Sheets

(56) References Cited

U.S. PATENT DOCUMENTS

| | | | |
|---|---|---|---|
| 2011/0296517 A1* | 12/2011 | Grigoriev | H04L 63/102 726/12 |
| 2013/0018893 A1* | 1/2013 | Nelson | G06Q 30/02 707/748 |
| 2013/0179440 A1 | 7/2013 | Gordon | |
| 2014/0074629 A1* | 3/2014 | Rathod | G06Q 10/10 705/14.73 |
| 2014/0095513 A1* | 4/2014 | Kriebel | G06F 17/30 707/748 |
| 2014/0249902 A1* | 9/2014 | Isaacson | G06Q 30/0217 705/14.19 |
| 2014/0250128 A1* | 9/2014 | Akin | G06F 17/30554 707/740 |
| 2014/0337100 A1* | 11/2014 | Crawford | G06Q 30/0201 705/7.32 |
| 2015/0248461 A1* | 9/2015 | Theeten | G06F 17/30516 707/718 |
| 2015/0293989 A1* | 10/2015 | Bhargava | G06F 17/30598 707/737 |
| 2015/0348071 A1* | 12/2015 | Cochrane | G06Q 30/0204 705/7.32 |

\* cited by examiner

METHOD AND SERVER FOR ANALYZING SOCIAL MEDIA CONTENT BASED ON SURVEY PARTICIPATION DATA RELATED TO A WEBSITE

TECHNICAL FIELD

More specifically, the present disclosure relates to a method, computer program product and server for analyzing social media content based on survey participation data related to a website.

BACKGROUND

The usage of websites to make dedicated web content available to a large public is now prevalent, in relation with the widespread usage of fixed Internet access and mobile Internet access. In particular, e-commerce has become a major component of the economy, in a plurality of business areas such as for example travel agencies, on-line banking, electronics and multimedia retail sales, etc. Websites in relation to professional services and administration are now also widely used to reach prospects and users.

There is a growing need for the owner or administrator of a website to better understand whether the visitors of the website are satisfied with their browsing experience, what was the intent of their visit, did they experiment a particular issue during the visit, etc. One way to obtain such information is to invite some of the visitors to participate to a web survey during or after the browsing of the website. By gathering and analyzing answers to the web survey over a panel of visitors, metrics such as the user experience or the intent of the user with respect to the visit of the website can be evaluated.

The usage of social media is also widespread among all segments of the population. In particular, opinions about the user experience or the intent of the user with respect to the visit of a website are also commonly expressed via the social media. Thus, by gathering and analyzing social media content, metrics such as the user experience or the intent of the user with respect to the visit of the website can also be evaluated. However, in contrast to the answers to the web surveys, the social media content is generally expressed in a free format and is not directed to serving the purposes of a dedicated survey. Consequently, the analysis of the social media content is more difficult in comparison to the analysis of the answers to a web survey. Furthermore, the analysis of the answers to a web survey and of the social media content both related to a same website are performed independently.

There is therefore a need for a method, computer program product and server for analyzing social media content based on survey participation data related to a website.

SUMMARY

According to a first aspect, the present disclosure provides a method for analyzing social media content based on survey participation data related to a website. The method comprises collecting survey participation data from a plurality of user devices at a survey server. The survey participation data correspond to survey information received from the users of each of the plurality of the user devices in relation to a visit of the website. The survey participation data comprise text and a metric. The method comprises analyzing the text of the survey participation data at the survey server, to generate a correlation between words or groups of words present in the text and the metric. The method comprises collecting social media content related to a visit of the website by users of another plurality of user devices. The social media content comprises text. The method comprises analyzing the text of the social media content, to identify the words or groups of words. The method comprises associating the social media content comprising the words or groups of words with the metric.

According to a second aspect, the present disclosure provides a computer program product comprising instructions deliverable via an electronically-readable media, such as storage media and communication links. The instructions comprised in the computer program product, when executed by a processing unit of a server, provide for analyzing social media content based on survey participation data related to a website, according to the aforementioned method.

According to a third aspect, the present disclosure provides a server comprising a communication interface for exchanging data with other devices, and a processing unit. The processing unit analyzes text comprised in survey participation data, to generate a correlation between words or groups of words present in the text and a metric comprised in the survey participation data. The survey participation data are collected from a plurality of user devices. The survey participation data correspond to survey information received from the users of each of the plurality of the user devices in relation to a visit of a website. The processing unit also analyzes text comprised in social media content, to identify the words or groups of words. The social media content is related to a visit of the website by users of another plurality of user devices. The processing unit further associates the social media content comprising the words or groups of words with the metric.

In a particular aspect, the analysis of the text of the survey participation data comprises performing a semantic categorization of the text of the survey participation data.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the correlation of survey participation data and social media content, both being generated in relation to the user experience, user intent, user satisfaction, etc. of visitors of a particular website.

The following terminology is used throughout the present disclosure:

Web survey: A web survey aims at collecting user feedback related to a visit of a website by a user. The term survey is used in a generic manner, and may include surveys, questionnaires, comment cards, etc.

Social media: Internet-based applications allowing the users of user devices executing the applications to create, share or exchange user generated social media content (e.g. information, ideas, pictures/videos, etc.) in virtual communities and networks. In the context of the present disclosure, the social media content is related to a visit of a website. Examples of social media include Twitter®, Facebook®, Google+® and Linkedin®.

Figure 1:
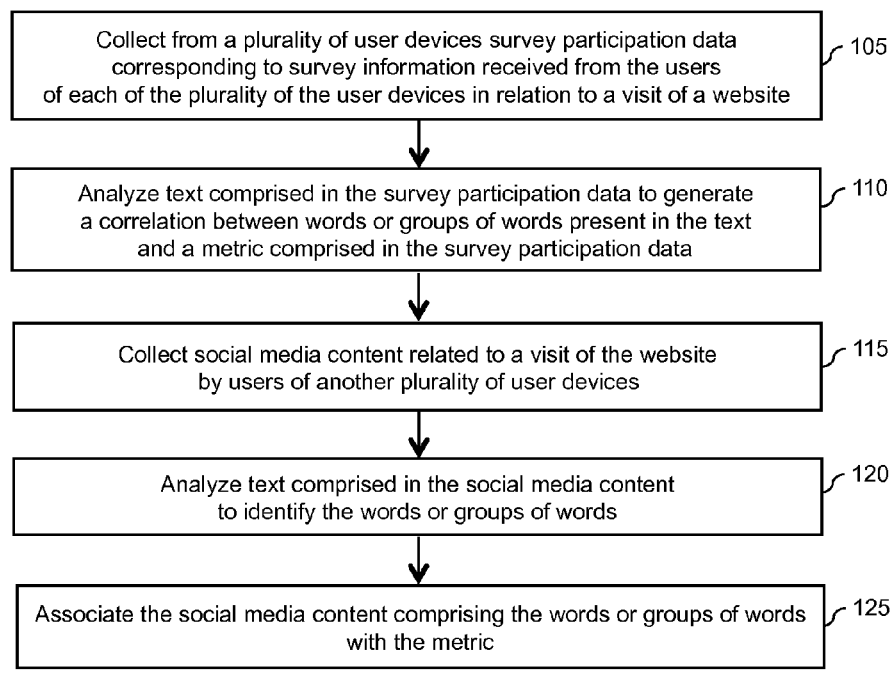
FIG. 1 illustrates a method for analyzing social media content based on survey participation data related to a website.
Figure 2:
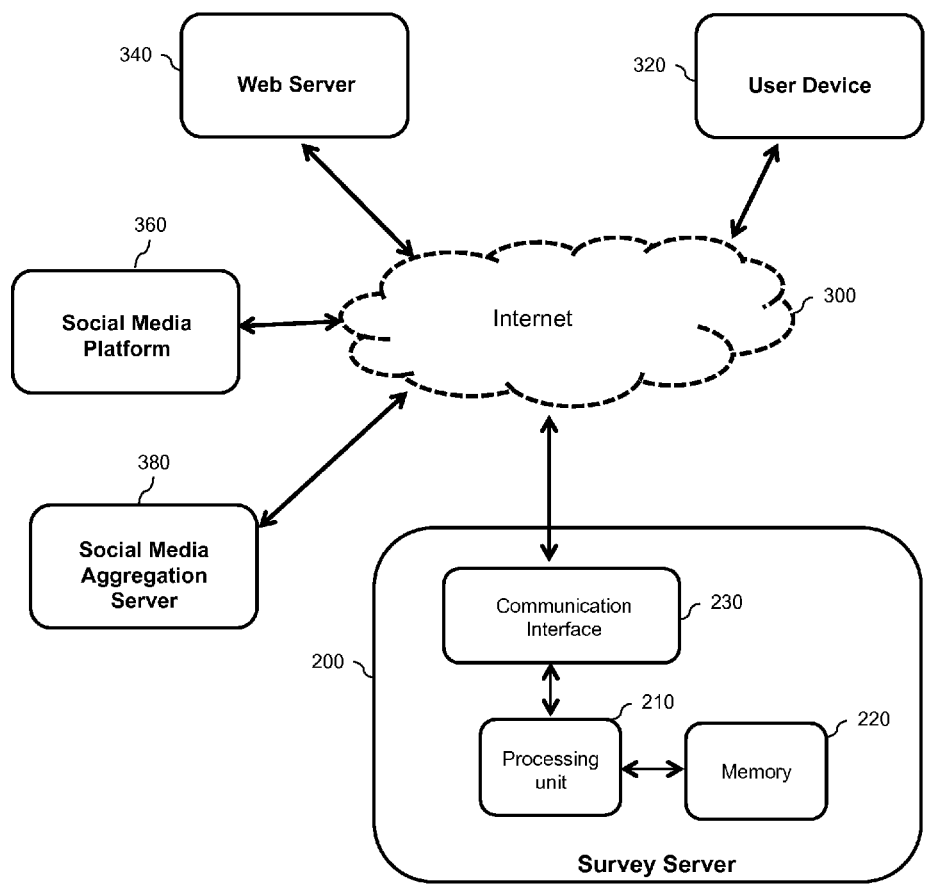
FIG. 2 illustrates a server for implementing the method of FIG. 1.

Referring now concurrently to FIGS. 1 and 2, a method 100 and a survey server 200 for analyzing social media content based on survey participation data related to a website are represented. At least some of the steps of the method 100 are performed by the survey server 200. Some of the steps of the method 100 may be performed by another entity, such as a social media aggregation server 380.

The survey server 200 comprises a processing unit 210, having one or more processors (not represented in FIG. 2 for simplification purposes) capable of executing instructions of computer program(s). Each processor may further have one or several cores. The survey server 200 also comprises memory 220 for storing instructions of the computer program(s) executed by the processing unit 210, data generated by the execution of the computer program(s), data received via a communication interface 230 of the survey server 200, etc. The survey server 200 may comprise several types of memories, including volatile memory, non-volatile memory, etc. The survey server 200 further comprises the communication interface 230, for exchanging data with other entities, such as a user device 320, and a third party server (e.g. the social media aggregation server 380 or a social media platform 360). The survey server 200 exchange data with the other entities through communication links, generally referred to as the Internet 300 for simplification purposes. Such communication links may include wired (e.g. a fixed broadband network) and wireless communication links (e.g. a cellular network or a Wi-Fi network).

In the rest of the description, we refer to instructions of a specific computer program. The instructions of the specific computer program implement the steps of the method 100 executed by a processing unit (e.g. 210) of a server (e.g. 200). The instructions are comprised in a computer program product (e.g. memory 220) and provide for analyzing social media content based on survey participation data related to a website, when executed by the processing unit (e.g. 210) of the server (e.g. 200). The instructions of the computer program product are deliverable via an electronically-readable media, such as a storage media (e.g. a USB key or a CD-ROM) or via communication links 300 through a communication interface (e.g. 230) of the server (e.g. 200).

The survey server 200 may further comprise a display (e.g. a regular screen or a tactile screen) for displaying data generated by the processing unit 210, and a user interface (e.g. a mouse, a keyboard, a trackpad, a touchscreen, etc.) for allowing a user to interact with the survey server 200.

The user device 320 may consist of a computer, a laptop, a mobile device (e.g. smartphone, tablet, etc.), an Internet connected television, etc. The user device 320 is capable of retrieving web content from a web server 340 over the Internet 300, and displaying the retrieved web content to a user of the user device 320 via a web browser. The user device 320 comprises a processing unit (for executing instructions of a computer program implementing the web browser), memory, a communication interface (e.g. cellular interface, Wi-Fi interface, Ethernet interface, etc.) for retrieving the web content from the web server 340, a display for displaying the retrieved web content, and a user interface for allowing interactions of the user of the user device 320 with the displayed web content. The components of the user device 320 are not represented in FIG. 2 for simplification purposes.

The web server 340 generally consists of a dedicated computer with high processing capabilities, capable of hosting one or a plurality of websites. The web server 340 comprises a processing unit, memory, and a communication interface (e.g. Ethernet interface, Wi-Fi interface, etc.) for delivering web content of a hosted website to the user device 320. The components of the web server 340 are not represented in FIG. 2 for simplification purposes.

Although a single user device 320 is represented in FIG. 2, a plurality of user devices 320 exchange data with the web server 340 in relation to a visit of a particular website (hosted by the web server 340) by the plurality of user devices 320.

The social media platform 360 and the social media aggregation server 380 also generally consist of a dedicated computer with high processing capabilities for processing a large amount of social media content generated by the user devices 320. The functionalities of the social media platform 360 and social media aggregation server 380 will be detailed later in the description, in relation to FIG. 3. The social media platform 360 and social media aggregation server 380 comprise a processing unit, memory, and a communication interface (e.g. Ethernet interface, Wi-Fi interface, etc.) for receiving the social media content. The components of the social media platform 360 and social media aggregation server 380 are not represented in FIG. 2 for simplification purposes.

Figure 3:
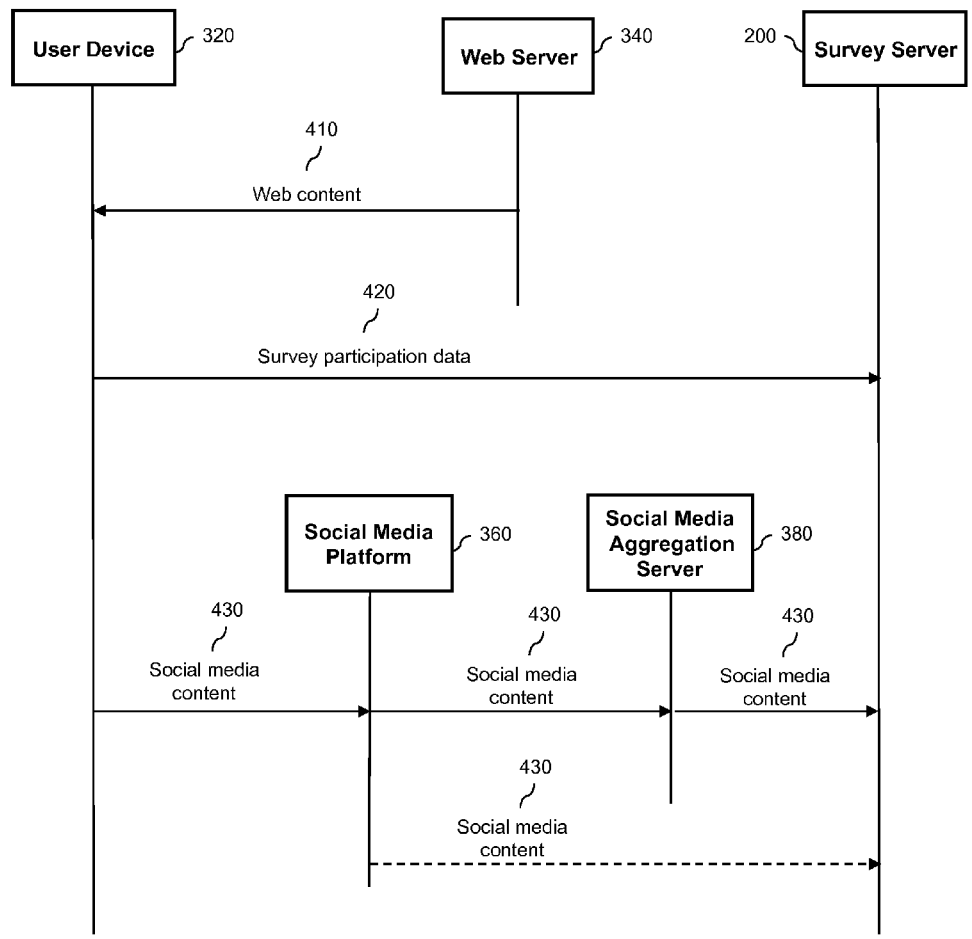
FIG. 3 illustrates data exchanges between entities represented in FIG. 2.

Referring now concurrently to FIGS. 1 and 3, the data exchanged between the different entities represented in FIG. 1 are detailed.

The user of the user device 320 is visiting a website (e.g. http://www.ecommerce.com) hosted by the web server 340. Web content 410 corresponding to the visited website is transmitted by the web server 340 to the user device 320 over the Internet 300. The interactions between the user device 320 and the web server 340 for exchanging the web content 410 are well known in the art. The web content 410 may include text, image(s), video(s), icon(s), etc. The web content 410 is displayed on the display of the user device 320 by the browser executed by the processing unit of the user device 320.

The user of the user device 320 participates to a web survey related to the visit of the website, and provides survey information by participating to the web survey. The processing unit of the user device 320 generates survey participation data 420 corresponding to the survey information provided by the user. The survey participation data 420 are transmitted by the user device 320 to the survey server 200 over the Internet 300. An example of survey participation data 420 comprises responses to a survey questionnaire related to the visited website, and includes at least one of the following: free-form text, ratings, selection of one or more elements among proposed alternatives, ordering of proposed elements, etc. An invitation to participate to the web survey may be prompted to the user of the user device 320 during the visit of the website, voluntarily triggered by the user of the user device 320 (e.g. through the selection of a survey icon), communicated to the user of the user device 320 in a delayed manner (e.g. through an email), etc. Users of a plurality of user devices 320 (not represented in FIG. 3 for simplification purposes) participate to the web survey, and the plurality of user devices 320 transmit corresponding survey participation data 420 to the survey server 200.

The user of the user device 320 generates social media content 430 (e.g. comments and feedback in a free-form text) related to the visit of the website. The generation of the social media content 430 related to the visit of the website may occur during the visit of the website, or afterwards. The social media content 430 is transmitted to the social media platform 360 over the Internet 300. A social media platform 360 is well known in the art. It generally consists of one or more servers hosting social media content generated by users of a plurality of user devices 320 (not represented in FIG. 3 for simplification purposes) via a particular social media (e.g. Twitter®, Facebook®, Google+®, Linkedin®, etc.). The hosted social media content is available to any user accessing the social media platform 360 through the Internet 300 via a computing device of the user (some restrictions may apply since part of the hosted social media content could be publicly available, and part of it only privately available to a restricted group of users).

The social media aggregation server 380 collects social media content 430 specifically related to the visited website. For instance, the social media aggregation server 480 collects social media content 430 hosted by the social media platform 360 through the Internet 300, and filters the collected social media content 430 based on a presence of the URL of the visited website in the collected social media content 430. The filtering may also be based on a brand, a company name, etc. in relation to the visited website.

The social media content 430 collected by the social media aggregation server 380 is transmitted to the survey server 200 through the Internet 300, to be processed along with the survey participation data 420 according to the method 100 represented in FIG. 1. Alternatively, the social media aggregation functionality implemented by the social media aggregation server 380 is directly implemented by the survey server 200. Thus, the survey server 200 directly collects social media content 430 specifically related to the visited website from the social media platform 360.

Although a single social media platform 360 is represented in FIG. 3, a plurality of social media platforms 360 corresponding to a plurality of social media (e.g. Twitter®, Facebook®, Google+®, Linkedin®, etc.) may host social media content 430 related to the visited web site. The social media aggregation server 380 collects the social media content 430 specifically related to the visited website from the plurality of social media platforms 360, and transmits the collected social media content 430 to the survey server 200. As mentioned previously, the social media content 430 specifically related to the visited website may also be directly collected by the survey server 200 from the plurality of social media platforms 360.

A user device 320 generating survey participation data 420 and social media content 430 related to the visited website is represented in FIG. 3. However, a user device 320 (not represented in FIG. 3) receiving web content 410 may generate no survey participation 420 and no social media content 430 related to the visited website. Alternatively, a user device 320 (not represented in FIG. 3) receiving web content 410 may generate only survey participation data 420 and no social media content 430 related to the visited website. In another alternative, a user device 320 (not represented in FIG. 3) receiving web content 410 may generate no survey participation data 420 and only social media content 430 related to the visited website.

Referring now concurrently to FIGS. 1, 2, 3 and 4A-B, the method 100 for analyzing social media content 430 based on survey participation data 420 related to a website will be detailed.

The method 100 comprises the step 105 of collecting survey participation data 420 from a plurality of user devices 320 at the survey server 200. The survey participation data 420 correspond to survey information received from the users of each of the plurality of the user devices 320 in relation to a visit of the website hosted by the web server 340.

The survey participation data 420 are transmitted over the Internet 300 by the user devices 320, and received by the processing unit 210 of the survey server 200 via its communication interface 230. The survey participation data 420 can be stored in the memory 220, before being further processed by the processing unit 210. The processing unit 210 may also filter the collected survey participation data 420, and discard some of them based on pre-determined criteria. The criteria may include at least one of the following: incomplete data, erroneous data, irrelevant data, etc.

The survey participation data 420 comprise text and a metric. The metric may be representative of one of the following: an experience of the users in relation to the visit of the website, an intent of the users in relation to the visit of the website. The user experience relates to the ease of interaction with the visited website. The intent relates to the reason for a user to visit the website, and may include for example finding information, purchasing a product or service, obtaining customer support, etc. The survey participation data 420 may include other metrics, such as satisfaction (e.g. global user satisfaction with respect to the visit of the website, satisfaction with a particular aspect of the visit such as a particular content displayed on a particular web page of the website, etc.), likelihood to return (likelihood of visiting the website again), likelihood to recommend the website to another person, brand perception (e.g. rating of a brand represented on the website), etc. The precise meaning of each metric may vary from one web survey to another, based on the specificities of the corresponding visited website. The metric is provided in a response to a closed-ended question of the survey. The text is provided in a response to an open-ended question of the survey.

Figure 4A:
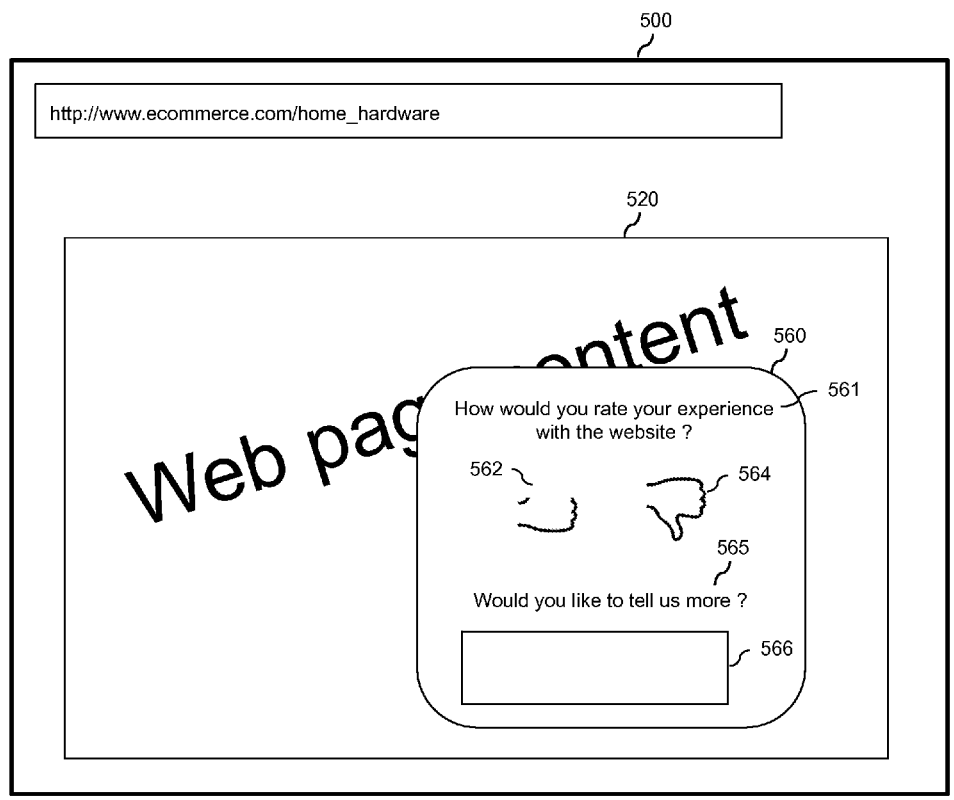
FIGS. 4A and 4B illustrate examples of web surveys respectively addressing a user experience and a user intent in relation to a visit of a website.

FIG. 4A illustrates an example of a web survey where the metric is an experience of the users in relation to the visit of the website. A Graphical User Interface 500 of a browser executed by a user device 320 displays web content related to the visited website (e.g. http://www.ecommerce.com) on the display of the user device 320. A GUI 560 for allowing the user of the user device 320 to provide the survey information is also displayed on the display of the user device 320. For example, the GUI 560 consists in an overlay popup window partially covering a browsing window 520 containing the web content, as illustrated in FIG. 4A.

A survey content displayed in the overlay popup window 560 comprises a closed-ended question 561 related to the user experience, a clickable thumb up icon 562 for indicating a good user experience with the website, a clickable thumb down icon 564 for indicating a bad user experience with the website, an open-ended question 565 inviting the user to provide optional additional feedback related to the user experience, and a text entry widget 566 for providing the optional additional feedback in a free-form text.

The interactions of the user with the GUI 560 (e.g. click on one of the thumb up icon 562 or thumb down icon 564, text entered in the text entry widget 566) generate survey participation data 420 representative of the experience of the user with the website. The survey participation data 420 comprise a Boolean (good or bad) corresponding to the user experience metric, and optionally the text entered in the text entry widget 566 also related to the user experience. In place of the thumb up 562 and thumb down 564 icons, a rating scale may be used. For example, the rating scale displays ten selectable integer values between 1 and 10 for rating the user experience. In this case, the survey participation data 420 comprise an integer value between 1 and 10 corresponding to the user experience metric.

Figure 4B:
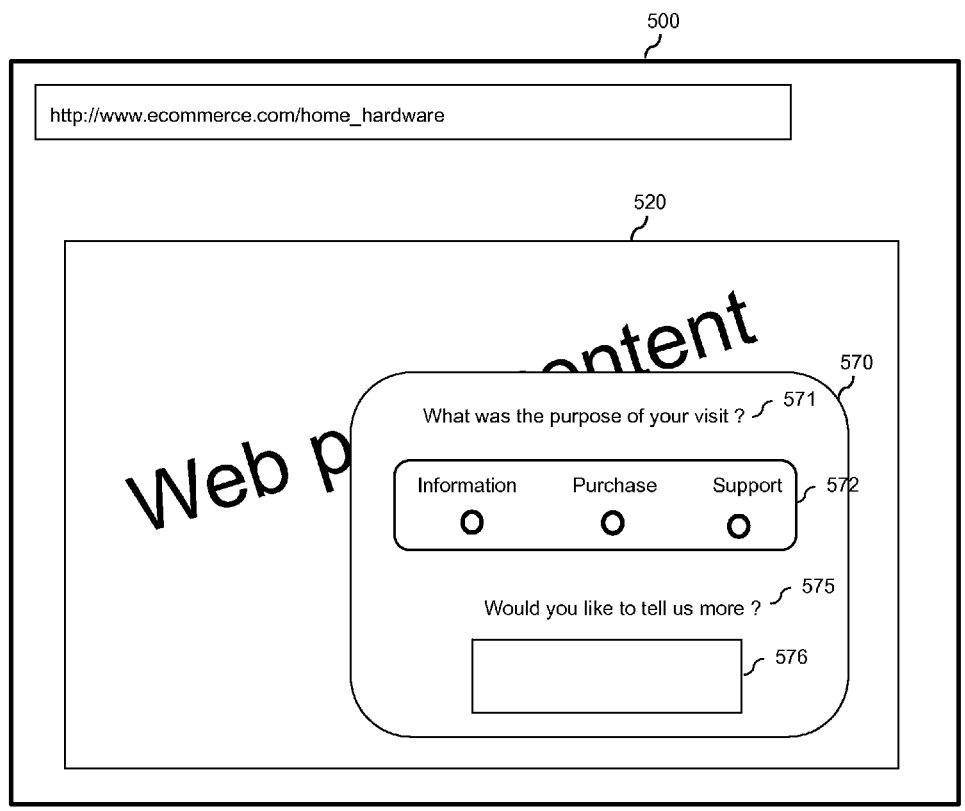

FIG. 4B illustrates another example of a web survey where the metric is an intent of the users in relation to the visit of the website. The survey content displayed in an overlay popup window 570 comprises a closed-ended question 571 related to the intent of the user, a selection widget 572 comprising three selectable items (information, purchase, support) corresponding to an intent of the user, an open-ended question 575 inviting the user to provide optional additional feedback related to the intent of the user, and a text entry widget 576 for providing the optional additional feedback in a free-form text.

The interactions of the user with the GUI 570 (e.g. selection of one of the three items of the selection widget 572, text entered in the text entry widget 576) generate survey participation data 420 representative of the intent of the user for visiting the website. The survey participation 420 data comprise a value selected among pre-defined values (e.g. 1 for information, 2 for purchase, 3 for support) corresponding to the user intent metric, and optionally the text entered in the text entry widget 576 also related to the intent of the user.

The method 100 comprises the step 110 of analyzing the text of the survey participation data 420, to generate a correlation between words or groups of words present in the text and the metric of the survey participation data 420. The analysis is performed by the processing unit 210 of the survey server 200. The analysis is performed on the text provided by the users of the plurality of user devices 320 having visited the website, the text being transmitted to the survey server 200 in the survey participation data 420.

The analysis of the text to generate the correlation may rely on at least one of the following techniques: statistical analysis of the text, natural language processing of the text (e.g. semantic categorization of the text), etc. For instance, statistical analysis may consist in identifying words or group of words having the highest occurrence in the text. However, the accuracy of such a statistical analysis is limited, since it does not introduce any knowledge of the corresponding metric (e.g. user experience, user intent, user satisfaction, etc.). Thus, words or groups of words with a high occurrence may not be relevant to the metric. On the contrary, techniques such as semantic categorization introduce knowledge of the metric in the analysis process. The usage of semantic categorization of the text for implementing step 110 of the method 100 will be detailed later in the description.

The method 100 comprises the step 115 of collecting social media content 430 related to a visit of the website by users of another plurality of user devices 320. As mentioned previously, the social media content 430 may be collected by at least one social media aggregation server 380 from at least one social media platform 360, and transmitted to the survey server 200. Alternatively, the social media content 430 is directly collected by the survey server 200 from at least one social media platform 360. The collected social media content 430 comprises text related to the visit of the website (e.g. comments, feedback, etc.).

The collected social media content 430 is transmitted over the Internet 300, and received by the processing unit 210 of the survey server 200 via its communication interface 230. The collected social media content 430 can be stored in the memory 220, before being further processed by the processing unit 210. The processing unit 210 may also filter the collected social media content 430, and discard some of it based on pre-determined criteria. The criteria may include at least one of the following: incomplete data, erroneous data, irrelevant data, etc.

The method 100 comprises the step 120 of analyzing the text of the social media content 430 to identify the words or groups of words identified at step 110 of the method 100. The analysis is performed by the processing unit 210 of the survey server 200. The analysis is performed on the text generated by the users of the other plurality of user devices 320 having visited the website, the text being transmitted to the survey server 200 in the social media content 430.

The method 100 comprises the step 125 of associating the social media content 430 comprising the words or groups of words with the metric identified at step 110 of the method 100. The association is performed by the processing unit 210 of the survey server 200.

In the case where the metric is an experience of the users in relation to the visit of the website (as illustrated in FIG. 4A), the social media content 430 comprising the words or groups of words is associated with a user experience. For example, if the social media content 430 consists in tweets generated on Twitter®, the tweets comprising the words or groups of words are associated with a user experience.

In the case where the metric is an intent of the users in relation to the visit of the website (as illustrated in FIG. 4B), the social media content 430 comprising the words or groups of words is associated with a user intent. For example, if the social media content 430 consists in tweets generated on Twitter®, the tweets comprising the words or groups of words are associated with a user intent.

In a particular aspect, the generation of a correlation between words or groups of words present in the text of the survey participation data 420 and the metric (performed at step 110 of the method 100) consists in generating a correlation between words or groups of words present in the text of the survey participation data 420 and a particular value of the metric.

In the case where the metric is an experience of the users in relation to the visit of the website (as illustrated in FIG. 4A), the survey participation data 420 comprise a Boolean (good or bad) corresponding to the user experience metric, and the text related to the user experience. The text of the survey participation data 420 comprising the Boolean good is analyzed separately, to generate a correlation between a first set of words or groups of words present in the text and the value of the user experience metric being good. Similarly, the text of the survey participation data 420 comprising the Boolean bad is analyzed separately, to generate a correlation between a second set of words or groups of words present in the text and the value of the user experience metric being bad. If the user experience is expressed via a rating scale, more than two values of the user experience metric may be possible (e.g. detestable, bad, neutral, good, excellent), and a corresponding number of correlations between the possible values of the user experience metric and corresponding sets of words or group of words is generated.

In the case where the metric is an intent of the users in relation to the visit of the website (as illustrated in FIG. 4B), the survey participation data 420 comprise a value selected among pre-defined values (e.g. 1 for information, 2 for purchase, 3 for support) corresponding to the user intent metric, and the text related to the user intent. The text of the survey participation data 420 comprising the value 1 (information) for the user intent metric is analyzed separately, to generate a correlation between a first set of words or groups of words present in the text and the value of the user intent metric being 1 (information). Similarly, a correlation is generated between a second set of words or groups of words present in the text and the value of the user intent metric being 2 (purchase), and a correlation is generated between a third set of words or groups of words present in the text and the value of the user intent metric being 3 (support).

Furthermore, associating the social media content 430 comprising the words or groups of words with the metric (performed at step 125 of the method 100) consists in associating the social media content 430 comprising the words or groups of words with the particular value of the metric.

In the case where the metric is an experience of the users in relation to the visit of the website (as illustrated in FIG. 4A) expressed as a Boolean (good or bad), the social media content 430 comprising the aforementioned first set of words or groups of words is associated with the value of the user experience metric being good. The social media content 430 comprising the aforementioned second set of words or groups of words is associated with the value of the user experience metric being bad. For example, if the social media content 430 consists in tweets generated on Twitter®, the tweets comprising the first set of words or groups of words are associated with a good user experience and the tweets comprising the second set of words or groups of words are associated with a bad user experience.

In the case where the metric is an intent of the users in relation to the visit of the website (as illustrated in FIG. 4B) expressed as a value selected among pre-defined values (e.g. 1 for information, 2 for purchase, 3 for support), the social media content 430 comprising the aforementioned first set of words or groups of words is associated with the value of the user intent metric being 1 (information). The social media content 430 comprising the aforementioned second set of words or groups of words is associated with the value of the user intent metric being 2 (purchase). The social media content 430 comprising the aforementioned third set of words or groups of words is associated with the value of the user intent metric being 3 (support). For example, if the social media content 430 consists in tweets generated on Twitter®, the tweets comprising the first set of words or groups of words are associated with a user intent being information, the tweets comprising the second set of words or groups of words are associated with a user intent being purchase, and the tweets comprising the third set of words or groups of words are associated with a user intent being support.

In another particular aspect, the survey participation data 420 comprise a plurality of metrics. The correlations performed at step 110 of the method 100 are generated between words or groups of words present in the text of the survey participation data 420 and each of the plurality of metrics. At step 125 of the method 100, social media content 430 comprising the words or groups of words correlated to a particular metric among the plurality of metrics is associated with the particular metric.

For example, participation to a web survey may trigger the generation of survey participation data 420 comprising a user experience metric (as illustrated in FIG. 4A) and a user intent metric (as illustrated in FIG. 4B). The text of the survey participation data 420 corresponding to the user experience metric is analyzed separately, to generate a correlation between a first set of words or groups of words present in the text and the user experience metric. Similarly, the text of the survey participation data 420 corresponding to the user intent metric is analyzed separately, to generate a correlation between a second set of words or groups of words present in the text and the user intent metric.

The social media content 430 comprising the first set of words or groups of words is associated with the user experience metric. The social media content 430 comprising the second set of words or groups of words is associated with the user intent metric. For example, if the social media content 430 consists in tweets generated on Twitter®, the tweets comprising the first set of words or groups of words are associated with a user experience. The tweets comprising the second set of words or groups of words are associated with a user intent.

As mentioned previously, the correlations performed at step 110 of the method 100 may also be generated between words or groups of words present in the text of the survey participation data 420 and a particular value of each of the plurality of metrics. At step 125 of the method 100, social media content 430 comprising the words or groups of words correlated to a particular value of a metric among the plurality of metrics is associated with the particular value of the metric.

In still another particular aspect, some steps of the method 100 may be performed by a third party server not represented in FIG. 2 for simplification purposes. For example, step 105 of the method 100 is performed by the survey server 200 and the collected survey participation data 420 are transmitted to the third party server. Step 115 of the method 100 is performed by the social media aggregation server 380 and the collected social media content 430 is transmitted to the third party server. Then, the third party server performs steps 110, 120 and 125 of the method 100.

In yet another particular aspect, semantic categorization of the text of the survey participation data 420 is used for implementing step 110 of the method 100. Semantic categorization is well known in the art, and comprises generating a taxonomy for analyzing the text. The taxonomy comprises a plurality of categories related to website analytics, and a plurality of words or groups of words (also referred to as verbatim) are associated to each categories.

Examples of categories include live support, price, log in/password, etc. For the category live support, examples of verbatim include: chat, customer service, phone, on-line, etc. The text (e.g. entered in response to open-ended questions 565 in FIG. 4A and 575 in FIG. 4B) is analyzed to find these verbatim. Following are examples of text comprising these verbatim: "chat for all even non customers", "improve customer service and resolving problems", "Phone waits can run in excess", "customer service on-line chat is SLOW & tedious", etc. For the category sign in, examples of verbatim include: log onto, sign in, signed into, log in, login, etc. Following are examples of text comprising these verbatim: "Can't log onto my account", "Could not sign in", "Couldn't get signed into my system", "won't let me log in", "Login issues", etc.

Capture of morphological, lexical, syntactic and pragmatic variations can be performed to increase the verbatim coverage. This is generally referred to as linguistic generalization in the art of semantic categorization. Additionally, identification and exclusion of phonologically similar, but semantically unrelated expressions can be performed to increase verbatim accuracy. This is generally referred to as disambiguation in the art of semantic categorization.

The semantic analysis is performed on the text of the survey participation data 420 received from the plurality of user device 320. The text corresponds to a metric (e.g. user experience, user intent, user satisfaction, etc.), and a correlation is made between the metric and one or more categories. For a specific category, all the verbatim associated to the categories, or only a subset of the verbatim, are correlated to the metric. The correlation is based on a frequency of occurrence of the verbatim in the text. The correlation can also be made between a particular value of the metric (e.g. good user experience, user intent being purchase, etc.) and one or more categories.

The list of categories can be customized to perform the semantic categorization of a particular metric (e.g. user experience, user intent, user satisfaction, etc.). Similarly, the list of verbatim of a specific category can also be customized to perform the semantic categorization of a particular metric.

The analysis of the social media content 430 performed at step 120 of the method 100 uses the categories and corresponding verbatim which have been correlated to the metric (or value of the metric) at step 110 of the method 100.

To improve the semantic categorization, it can be performed based on industry-specific categories defined for a particular industry (e.g. automotive, travel agencies, on-line banking, electronics and multimedia retail sales, etc.) to which the website is related. A standardized categorization process using standard categories can be used to address all types of industries. A semi-standardized categorization process using specific categories can be used to address specific industries. For instance, the semi-standardized process may include adding or removing categories to the list of standard categories used for the standardized categorization process. Additionally, the list of verbatim of a particular category can be customized for a specific industry.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for analyzing social media content based on survey participation data related to a website, comprising:
   collecting at a survey server survey participation data from a plurality of user devices, the survey participation data corresponding to survey information received from the users of each of the plurality of the user devices in relation to a visit of the website, the survey participation data comprising text and a metric;
   analyzing at the survey server the text of the survey participation data to generate a correlation between words or groups of words present in the text of the survey participation data and a value of the metric;
   collecting social media content related to a visit of the website by users of another plurality of user devices, the social media content comprising text; analyzing the text of the social media content to identify the words or groups of words; and
   associating the social media content comprising the words or groups of words with the value of the metric;
   wherein the value of the metric consists in a rating of an experience of the users in relation to the visit of the website, a selection of one among a plurality of pre-defined intents of the users in relation to the visit of the website, a rating of a satisfaction of the users in relation to the visit of the website, a rating of a likelihood to return to the website, a rating of a likelihood to recommend the website, or a rating of a brand perception in relation to the website.

2. The method of claim 1, wherein analyzing the text of the survey participation data comprises performing a semantic categorization of the text of the survey participation data.

3. The method of claim 2, wherein the semantic categorization is performed based on industry-specific categories defined for an industry to which the website is related.

4. The method of claim 1, wherein the metric is representative of one of the following: an experience of the users in relation to the visit of the website, an intent of the users in relation to the visit of the website, a satisfaction of the users in relation to the visit of the website, a likelihood to return to the website, a likelihood to recommend the website, and a brand perception in relation to the website.

5. The method of claim 1, wherein the plurality of pre-defined intents of the users comprises at least one of the following: information, purchase and support.

6. The method of claim 1, wherein: the survey participation data comprise a plurality of metrics; correlations are generated between words or groups of words present in the text of the survey participation data and each of the plurality of metrics; and social media content comprising the words or groups of words correlated to one metric among the plurality of metrics are associated with the one metric among the plurality of metrics.

7. The method of claim 1, wherein the text of the survey participation data is provided in a response to an open-ended question of the survey and the metric is provided in a response to a closed-ended question of the survey.

8. A non-transitory computer program product comprising instructions deliverable via an electronically-readable media, such as storage media and communication links, the instructions when executed by a processing unit of a server provide for analyzing social media based on survey participation data related to a website by:
   analyzing by the processing unit of the server text comprised in survey participation data to generate a correlation between words or groups of words present in the text comprised in the survey participation data and a value of a metric comprised in the survey participation data, the survey participation data being collected from a plurality of user devices, the survey participation data corresponding to survey information received from the users of each of the plurality of the user devices in relation to a visit of the website;
   analyzing by the processing unit of the server text comprised in social media content to identify the words or groups of words, the social media content being related to a visit of the website by users of another plurality of user devices;
   an associating by the processing unit of the server the social media content comprising the words or groups of words with the value of the metric;
   wherein the value of the metric consists in a rating of an experience of the users in relation to the visit of the website, a selection of one among a plurality of pre-defined intents of the users in relation to the visit of the website, a rating of a satisfaction of the users in relation to the visit of the website, a rating of a likelihood to return to the website, a rating of a likelihood to recommend the website, or a rating of a brand perception in relation to the website.

9. A server, comprising:
a communication interface for:
exchanging data with other devices;
a processing unit comprising at least one processor for:
- analyzing text comprised in survey participation data to generate a correlation between words or groups of words present in the text comprised in the survey participation data and a value of a metric comprised in the survey participation data, the survey participation data being collected from a plurality of user devices, the survey participation data corresponding to survey information received from the users of each of the plurality of the user devices in relation to a visit of a website;
- analyzing text comprised in social media content to identify the words or groups of words, the social media content being related to a visit of the website by users of another plurality of user devices; and
- associating the social media content comprising the words or groups of words with the value of the metric;
wherein the value of the metric consists in a rating of an experience of the users in relation to the visit of the website, a selection of one among a plurality of pre-defined intents of the users in relation to the visit of the website, a rating of a satisfaction of the users in relation to the visit of the website, a rating of a likelihood to return to the website, a rating of a likelihood to recommend the website, or a rating of a brand perception in relation to the website.

10. The server of claim 9, wherein analyzing the text of the survey participation data comprises performing a semantic categorization of the text of the survey participation data.

11. The server of claim 10, wherein the semantic categorization is performed based on industry-specific categories defined for an industry to which the website is related.

12. The server of claim 9, wherein the processing unit collects the survey participation data from the plurality of user devices via the communication interface.

13. The server of claim 9, wherein the processing unit collects the social media content from at least one social media platform.

14. The server of claim 9, wherein the metric is representative of one of the following: an experience of the users in relation to the visit of the website, an intent of the users in relation to the visit of the website, a satisfaction of the users in relation to the visit of the website, a likelihood to return to the website, a likelihood to recommend the website, and a brand perception in relation to the website.

15. The server of claim 9, wherein the plurality of pre-defined intents of the users comprises at least one of the following: information, purchase and support.

16. The server of claim 9, wherein: the survey participation data comprise a plurality of metrics; correlations are generated between words or groups of words present in the text of the survey participation data and each of the plurality of metrics; and social media content comprising the words or groups of words correlated to one metric among the plurality of metrics are associated with the one metric among the plurality of metrics.

* * * * *